April 16, 1946.   P. W. EMLEY   2,398,366
RECTIFIED CURRENT FLOW INDICATING SYSTEM
Filed Jan. 18, 1943
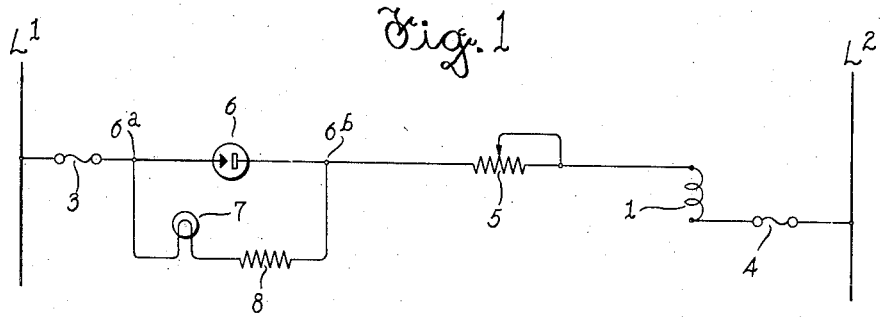
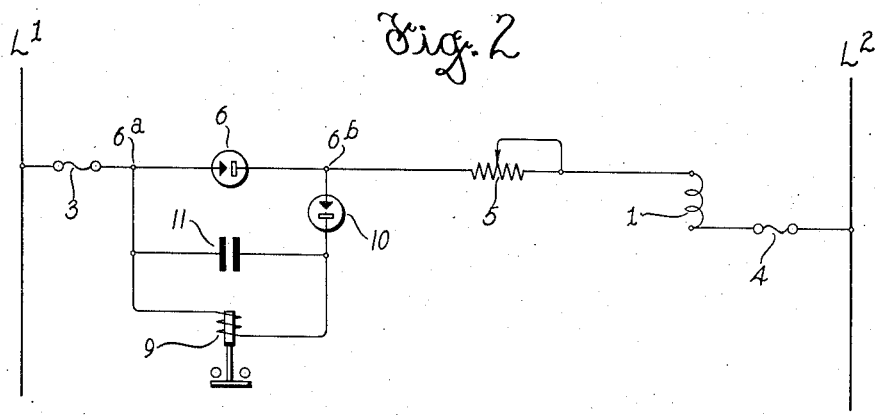
Inventor
Philip W. Emley
By Frank H. Hubbard
Attorney Patented Apr. 16, 1946

2,398,366

UNITED STATES PATENT OFFICE 2,398,366

RECTIFIED CURRENT FLOW INDICATING SYSTEM

Philip W. Emley, Wauwatosa, Wis., assignor to Cutler-Hammer, Inc., Milwaukee, Wis., a corporation of Delaware Application January 18, 1943, Serial No. 472,721

4 Claims. (Cl. 177—311)

This invention relates to an indicating or signaling system for indicating disturbances in the operation of a translating circuit supplied with rectified current from an alternating current source of supply. The invention is particularly applicable to signaling systems for use in connection with translating devices energized by a current derived from an alternating current source and which is rectified by a half-wave rectifier.

In accordance with the invention an indicating or signaling device is connected across the terminals of a half-wave rectifier, which is connected in circuit with a translating device supplied from an alternating current source, whereby the current of the signaling device is shunted around the rectifier so that upon interruption of the continuity of the circuit to the translating device or upon the rectifier becoming short-circuited, current will also cease to flow through the signaling device and cause it to thereby indicate the disturbance.

The circuit of the indicating device is so proportioned that the small alternating current which flows through it has no measurable effect upon the operation of the main translating device.

In the event of a short-circuit through the rectifier the value of the current through the indicating device is substantially reduced below its normal value to afford an indication of such condition.

An object of the invention is to provide in a half-wave rectifying circuit, an indicating device which is effective to indicate the flow of current in the circuit.

Another object is to provide an extremely simple and inexpensive visual or audible indication of the continuity of current flow in a circuit supplied with half-wave rectified alternating current.

Another object is to provide in a circuit of the aforementioned type an indicating lamp which is normally energized and which is extinguished if the translating circuit is opened.

Another object is to provide in a circuit of the aforementioned type an indication of the normal functioning of the rectifier.

Another object is to provide in a circuit of the aforementioned type an indicating device which will respond to the current flowing in the translating circuit.

Other objects and advantages will hereinafter appear.

The accompanying drawing illustrates in diagrammatic form two embodiments of the invention.

In the drawing,

Figure 1 is a diagram of a translating device connected to an alternating current supply circuit through a half-wave rectifier, and provided with an indicating lamp to indicate the condition of the circuit, and Fig. 2 is a modification of Fig. 1, in which a relay is employed to indicate the condition of the circuit.

In Fig. 1 the reference characters $L^1$ and $L^2$ designate the bus bars of an alternating current supply circuit. The energizing coil 1 of a magnetic vibrator, which is adapted to operate on half-wave rectified current, is connected to the lines $L^1$, $L^2$ in series with fuses or other current limiting devices 3 and 4, a variable resistor 5, and a half-wave rectifier 6. Connected across the terminals of the rectifier 6 is an indicating lamp 7, and in series therewith may be connected a resistor 8; the resistor 8 being necessary only if the lamp 7 is designed for a voltage differing from the voltage obtaining across the rectifier 6.

The variable resistor 5 provides for variation of the value of current supplied to the translating device 1. The value of current flowing through the circuit in shunt with the rectifier 6 and containing the lamp 7, is small compared with the value of the rectified intermittent current flowing through the translating device 1, so as not to materially affect operation of the latter.

During the half-cycle when current flows through the rectifier 6, the effective resistance across its terminals is very low compared with that of the shunt circuit containing the lamp 7, so that only an inconsequential current flows through the lamp 7. On the other hand, during the half-cycle when the rectifier 6 is non-conducting, substantially the full line voltage is impressed upon the terminals of the rectifier 6 and the shunt circuit containing the lamp 7. This is due to the fact that the voltage drop in the resistor 5 and the translating device 1 produced by the current of the lamp 7 is very small on account of the low value of current consumed by the lamp. Thus the lamp is energized to emit light during alternate half-cycles, and, due to the thermal inertia of the lamp filament and the persistence of vision, the lamp appears to emit a bright light at all times.

If the resistance of the rectifier 6 to the flow of the reverse half-cycle of the alternating current should become low or the rectifier should become short-circuited, the current in the shunt circuit drops to a low value, which causes dimming or even complete extinguishment of the lamp 7.

Furthermore, if one of the fuses 3 or 4 should be disrupted to open the circuit, or if the circuit to the translating device should open at any other point except inside of the rectifier itself, the current supply to the lamp is interrupted and the light is extinguished.

Instead of using a lamp, any other indicating device which is capable of responding to a half-wave rectified current may be employed in the shunt circuit.

Thus in Fig. 2 I have shown a modification wherein the energizing winding 9 of an electromagnetic relay is connected in series with a second half-wave rectifier 10, across the terminals 6ª and 6ᵇ of the main rectifier 6. Connected across the terminals of the winding 9 is a condenser 11. The rectifier 10 is so connected with respect to the rectifier 6 that it will conduct current when the rectifier 6 is non-conducting; the polarity of the terminal of the rectifier 10 which is connected to the terminal 6ᵇ, however, being opposite to that of the latter.

The system shown in Fig. 2 operates in substantially the same manner as the system of Fig. 1, except that during the half-cycle when the rectifier 6 is non-conducting a charging current flows from line L², through the translating device 1, rectifier 10 and condenser 11 to the line L¹; thus charging the condenser 11 to the peak potential of the alternating current circuit. On the succeeding half-cycle the rectifier 6 becomes conducting while the rectifier 10 becomes non-conducting. Thus the condenser 11 is prevented from discharging through the rectifiers, but it discharges through the energizing winding 9, the current flowing in the same direction as the current flowed through said winding during the preceding half-cycle. The relay 9 is thus supplied with a rectified current during each half-cycle of the alternating current. By suitable proportioning of the condenser 11 the ripples of this current can be smoothed out to any desired degree. However, care must be taken that during the half-cycles when no current flows through the rectifier 6, the combined shunt current flowing through the winding 9 and the charging current of the condenser 11 does not exceed the permissible alternating current component flowing through the translating device 1.

Failure of the rectifier 6 or blowing of one of the fuses 3 or 4 in the system of Fig. 2 will affect the indicating device 9 in the same manner as described in connection with lamp 7 of Fig. 1. Moreover, the same result upon the indicating device 9 will follow failure of rectifier 10.

It will be obvious that the electromagnetic winding 9 of Fig. 2 may be replaced by the lamp 7 of Fig. 1, and vice versa.

Due to the characteristic of the rectifier 6 by virtue of which the reverse current terminal voltage thereof is unaffected by the current flowing therein during the conducting period, the average or effective voltage impressed upon the shunt circuit containing the signaling device varies to a lesser degree than the effective current through the translating device as an incident to different adjustments of the resistor 5. Hence the functioning of the signaling device is not impaired by relatively wide variations of the value of rectified current supplied to the translating device.

The invention is not limited to use with magnetic vibrators, but the translating device 1 may be, for instance, a storage battery which is to be charged by alternate half-waves of an alternating current. In the case of a storage battery the invention is of special advantage, as response of the signal or indicating device is substantially unaffected by the varying charging rate of the battery.

It will likewise be apparent that any other translating device which is adapted to operate on half-wave rectified current, and which is not substantially affected by the simultaneous passage therethrough of a low value of alternating current, may be substituted for the vibrator shown and described herein.

Various other modifications of the system coming within the scope of the appended claims will at once suggest themselves to those skilled in the art.

I claim:

1. In a system for supplying a periodic unidirectional current to a translating device, the combination with an alternating current source, of a unidirectionally conducting circuit connected in series with said source, said circuit comprising an electromagnetic vibrator adapted to vibrate at the frequency of said source and a single half-wave rectifier connected in series with said vibrator, and an indicating device connected in parallel with said rectifier and responsive to the flow of reverse half-waves of current from said source through said vibrator without substantially affecting the normal operation of the latter.

2. In a system for supplying a periodic unidirectional current to a translating device, the combination with an alternating current source, of an electromagnetic vibrator adapted to vibrate at the frequency of said source, a half-wave rectifier connected in series with said vibrator and said source, and an indicating device connected in parallel with said rectifier and responsive to the variations of the effective potential between the terminals of the latter, the impedance of said indicating device being such that the current which it permits to flow between said source and said vibrator during the half-cycles when said rectifier is non-conducting does not substantially affect the operation of said vibrator.

3. In a system for supplying a periodic unidirectional current to a translating device, the combination with an alternating current source, of an electromagnetic vibrator adapted to vibrate at the frequency of said source, a half-wave rectifier connected in series with said vibrator and said source, and an indicating device connected in parallel with said rectifier and responsive to the variations of the effective potential between the terminals of the latter, the impedance of said indicating device being high with respect to the normal impedance of said rectifier when the latter is conducting.

4. In a system for supplying a periodic unidirectional current to a translating device, the combination with an alternating current source, of an electromagnetic vibrator adapted to vibrate at the frequency of said source, a first half-wave rectifier connected in series with said vibrator and said source, a second half-wave rectifier and an indicating device connected in series with each other and in shunt with said first rectifier, the two rectifiers being respectively connected in opposite directions with respect to said source, and a condenser connected in shunt with said indicating device, said indicating device being responsive to the variations of the effective potential between the terminals of said first rectifier and having an impedance of the order of the normal reverse current impedance of said first rectifier.

PHILIP W. EMLEY.